(12) United States Patent
Mory et al.

(10) Patent No.: US 6,725,234 B2
(45) Date of Patent: Apr. 20, 2004

(54) METHODS OF PARTITIONING A SET OF OBJECTS AND SEARCH METHOD IN A PARTITION OF A SET OF OBJECTS

(75) Inventors: Benoit Mory, Paris (FR); Nicolas Santini, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 249 days.

(21) Appl. No.: 09/995,466

(22) Filed: Nov. 28, 2001

(65) Prior Publication Data

US 2002/0114514 A1 Aug. 22, 2002

(30) Foreign Application Priority Data

Nov. 28, 2000 (FR) .............................. 00 15351

(51) Int. Cl.[7] .............................................. G06F 17/30
(52) U.S. Cl. ................ 707/103 R; 707/101; 707/103 Y
(58) Field of Search .................... 707/104.1, 103 R, 707/103 Y, 101; 715/501.1; 375/240.14; 382/305

(56) References Cited

U.S. PATENT DOCUMENTS 6,574,378 B1 * 6/2003 Lim ........................... 382/305
6,600,784 B1 * 7/2003 Divakaran et al. ..... 375/240.14
2002/0069218 A1 * 6/2002 Sull et al. ................ 707/501.1

OTHER PUBLICATIONS

K. Chidananda Gowda et al, "Symbolic Clustering Using a New Dissimilarity Measure", Pattern Recognition, vol. 24, No. 6, pp 567–578, 1991.

K. Alsabti et al, "An Efficient K–Means Clustering Algorithm", IPPS/SPDP Workshop on High Performance Data Mining, 1998, Orlando Fl.

* cited by examiner

Primary Examiner—Charles Rones
Assistant Examiner—Neveen Abel Jalil

(57) ABSTRACT

The invention relates to a partitioning method of a set of objects which comprises an initialization phase for determining a partition which has an optimal number of classes, and a modification phase of this partition for obtaining a partition whose classes have optimal contents from the point of view of the search for objects.

The invention also relates to a multilevel partitioning method of partitioning a set of objects which utilizes such a partitioning method for creating a tree-like structure of objects. The invention finally relates to a search method, for example, of searching a certain number of objects which are closest to an example in the tree-like structure obtained in this manner.

9 Claims, 4 Drawing Sheets

METHODS OF PARTITIONING A SET OF OBJECTS AND SEARCH METHOD IN A PARTITION OF A SET OF OBJECTS

FIELD OF THE INVENTION

The invention relates to a partitioning method of partitioning a set of objects, comprising:
- a first iterative partitioning step, which utilizes a first partition formed by classes containing an object and which, at each iteration, combines two classes that maximize a criterion of similarity for creating a new partition used as an initial partition for the next step, until a partition is obtained that contains only a single class,
- a selection step of selecting from the obtained partitions a partition which comprises an optimal number of classes.

The invention also relates to a multilevel partitioning method of partitioning a set of objects, which utilizes such a partitioning method.

The invention finally relates to a method of searching a predetermined number of objects which are closest to an example in a tree-like structure of objects created by using such a multilevel partitioning method.

The invention further relates to computer programs for implementing such methods. The invention also relates to equipment which comprises data storage and data processing means, of which notably means for implementing such methods. The invention finally relates to a data transmission system which comprises at least such equipment.

The invention has interesting applications in the field of data classification, notably data relating to audio and/or video, for example, MPEG-7 descriptions.

Data storage and transmission capacities augment considerably, so much so that in many fields including the field of consumer electronics, the user, however, has difficulty in managing the information he or she has at his or her disposal. In this context the methods of partitioning a set of objects become ever more important. They notably apply to the navigation in a set of objects and to the search for objects.

BACKGROUND OF THE INVENTION

The article <<Symbolic Clustering using a new dissimilarity measure>> by K. Chidananda Gowda and E. Diday, published in the journal <<Pattern Recognition>>, vol. 24 no. 6, pp. 567–578, 1991, describes a partitioning method of a set of objects as cited in the introductory paragraph and called <<Hierarchical Agglomerative Clustering Methodology>>.

This partitioning method provides an optimal number of classes. But, the obtained partition is not well adapted to the search for objects.

SUMMARY OF THE INVENTION

The invention notably has for its object to propose a partitioning method of partitioning a set of objects particularly well adapted to the search for objects. For this purpose, a method according to the invention and as described in the opening paragraph is characterized in that it comprises:
- a step of calculating elements which are representative of classes of the selected partition,
- a second iterative partitioning step which utilizes the selected partition as a first current partition and which, at each iteration, creates a new partition by associating each object of said set with the element which represents the current partition it is closest to, and calculates elements which represent classes of the new partition, the new partition forming the current partition for the next iteration, until the elements which are representative of the new partition are identical with the elements which are representative of the current partition.

Thus the method according to the invention comprises determining in a first stage a partition that contains an optimal number of classes, and then modifying the classes so that their contents are adapted to the search for objects.

It should be observed that the article "An efficient K-means clustering algorithm" by K. Alsabti, S. Ranka and V. Singh, published on the occasion of the "IPPS/SPDP Workshop on High Performance Data Mining, 1998, Orlando, Fla." describes a partitioning method called "K-means" which permits to divide a set of objects into a number N of classes known a priori, by choosing N start prototypes. This method is iterative. At each iteration each object is combined with the prototype it is closest to so as to determine classes, after which the prototype of each class is recalculated. The new obtained prototype serves as a start prototype for the next iteration. The final partition is obtained when the convergence is reached, that is to say, when all the new obtained prototypes correspond to the start prototypes at the end of an iteration.

This method makes it necessary to know a priori the number of classes of the partition to be constructed and to have a set of start prototypes.

The invention thus notably comprises the use of a "hierarchical agglomerative clustering" method for the initialization of a method of the type "K-means", so as to provide a partitioning method whose number of classes and the contents of the classes are optimal as regards the search for objects.

In a general manner, the invention can be applied to any type of objects provided that a similarity measure f is defined for this type of objects and that this measure of similarity satisfies the following conditions:
- f is an application which associates two objects with a real number,
- this real number is identical whatever the order in which the two objects are considered,
- the real number associated with two identical objects is higher than the real number associated with two different objects.

In a particularly interesting embodiment of the invention said objects are meta data, that is to say, structures containing a set of data. They are, for example, descriptions of video shots, notably descriptions of the MPEG-7 type. The MPEG-7 standard project defines indeed a certain number of descriptors for video shots (color descriptors, text descriptors, camera movement descriptors . . . ), as well as similarity measures associated with these descriptors. For more details reference is made to the document ISO/IEC JTC1/SC29/WG11 N3521 (July 2000) entitled "Coding of moving pictures and associated audio information", which refers to the document "Visual Working Draft" version 4.0.

A second object of the invention is to propose a multilevel partitioning method of a set of objects. In accordance with the invention such a method comprises:
- a partitioning step which utilizes a partitioning method as described above for determining a partition of a group of objects,
- a step of determining elements which are representative of classes of the obtained partition, a step of storing said representative elements in a tree-like structure, said steps being executed a first time with a group of objects formed by said set, then repeated with groups of objects formed by the classes of the obtained partitions so as to obtain classes that satisfy a predetermined criterion, a step of storing the last partition in said tree-like structure.

The tree-like structure thus obtained forms a partition of the set of objects which has several levels. This type of partition is particularly advantageous for searching in a set of a large number of objects, because it permits to accelerate the search. Actually, with a single-level partition, when the size of the set of objects increases significantly, this brings about either the increase of the number of classes, or the increase of the number of objects contained in each class. In either one of the two cases one is led to compare the example searched for with a much larger number of objects. The processing time thus increases considerably. On the contrary, with a multilevel partition, the example searched for is only compared with a restricted number of objects at each level of the partition. The increase of the size of the set thus has much less influence on the processing time of the search.

A third object of the invention is to propose a method of searching a predetermined number of objects which are closest to an example in a tree-like structure of objects, which comprises nodes and leaves and which has been created with a multilevel partitioning method as described above is used.

According to the invention such a search method comprises the following steps:

a step of passing through the tree-like structure, starting from a node and going to the leaves while passing by the nodes which contain the representative elements that are closest to the example, to select one or various leaves which correspond to one or various objects, a step of testing whether the number of selected leaves is lower than said predetermined number of objects, and, if the number of selected leaves is lower than said predetermined number of objects, a new iteration of said steps starting from the brother node of the node passed through last, which contains the representative element that is closest to said example.

BRIEF DESCRIPTION OF THE DRAWINGS

These and other aspects of the invention are apparent from and will be elucidated, by way of non-limitative example, with reference to the embodiment(s) described hereinafter.

In the drawings.

DESCRIPTION OF EMBODIMENTS OF THE INVENTION

Figure 1:
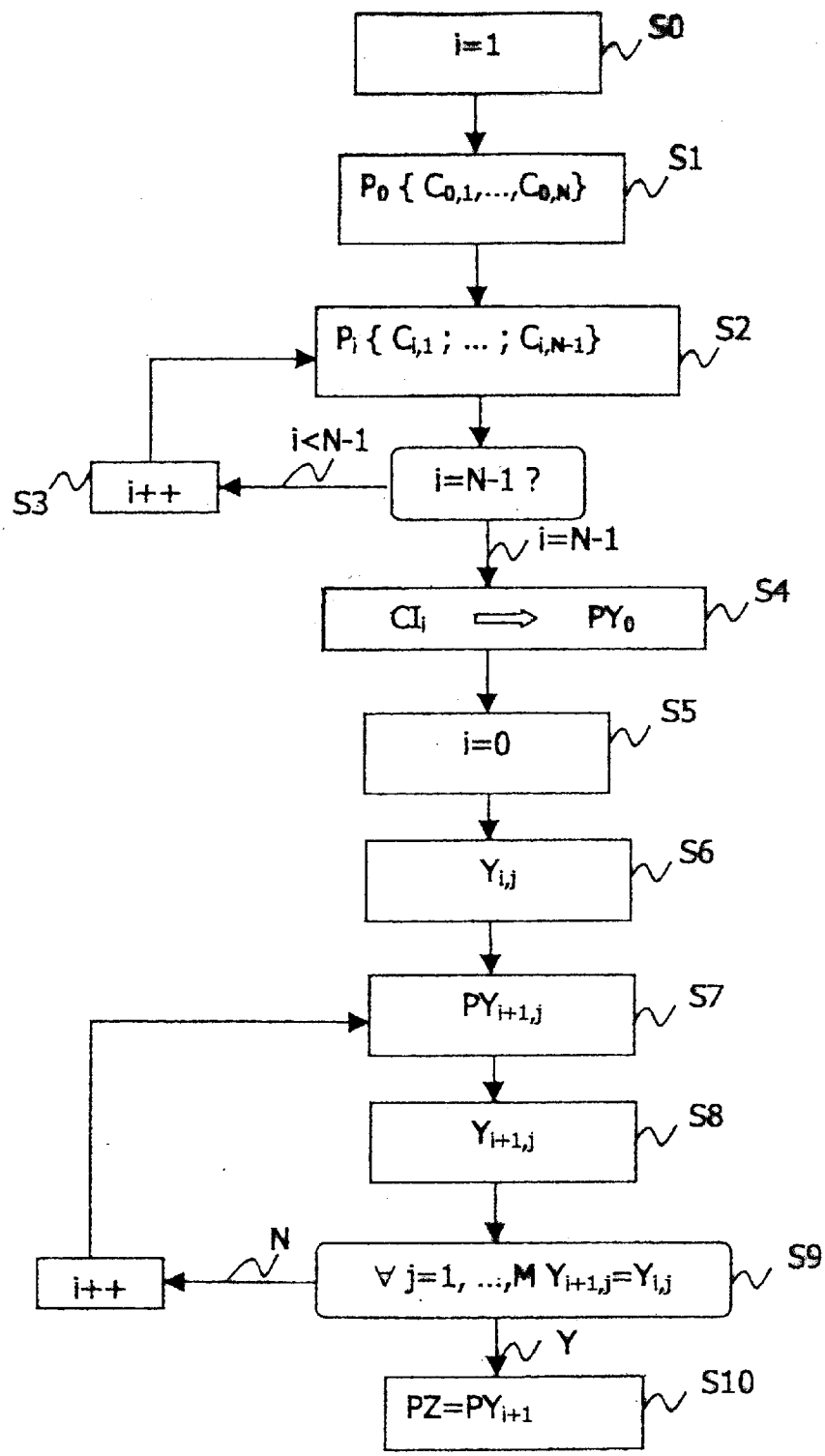
FIG. 1 is a block diagram of an example of the partitioning method according to the invention.

FIG. 1 shows a block diagram of an example of a partitioning method according to the invention. In the following it is considered that $\{x_1, x_2, \ldots x_N\}$ are N objects of a set of objects X. The method of FIG. 1 comprises the following steps:

(S0): The index i is initialized: i=1

(S1): An initial partition $P_0$ of the set X is defined. This initial partition $P_0$ comprises N classes $C_{0,1}, \ldots, C_{0,N}$, each containing one object.

(S2): The two classes of the partition $P_{i-1}$, which maximize a certain similarity criterion, are combined so as to form the new partition $P_i$ comprising N−i classes.

(S3): Step S2 is repeated so as to obtain a single class containing all the objects of the set under consideration (i=2, ..., N−1).

(S4): For each partition $P_i$ thus obtained, an indicator $CI_i$ is calculated. The partition $PY_0$ for which this indicator is maximum is the partition that contains an optimal number of classes M. By way of example an indicator is used of the type that is described in the article by K. Chidananda Gowda and E. Diday, that is:

$$CI_i = \frac{R_i}{R_{i-1}}$$

with $$R_i = \frac{MIN_i}{MIN_{i-1} + MIN_{i+1}}$$

where $MIN_1$ is the minimum dissimilarity between two classes for the partition $P_i$.

The dissimilarity D(Z1, Z2) between two classes Z1 and Z2 s defined, for example, in the following manner: D(Z1, Z2)=1−f(Z1, Z2) where f(Z1, Z2) is the similarity between the two classes Z1 and Z2.

(S5): The index i is re-initialized (i=0)

(S6): An element is calculated which is representative of each class of the partition $PY_i$. These representative elements are denoted $Y_{ij}$ where j=1 ... M (M being the number of classes of the partitions $PY_i$).

(S7): The new partition $PY_{i+1}$ is created by associating the objects of the initial set with a representative element $Y_{ij}$ which they are closest to. The proximity of two objects is determined by utilizing a similarity function f which verifies the following properties:

f is an application which associates two objects with a real number, this real number is identical whatever the order in which the two objects are considered, the real number associated with two identical objects is higher than the real number associated with two different objects.

(S8): A representative element $Y_{i+1j}$ is calculated for each class of the partition $PY_{i+1}$ thus obtained.

(S9): It is verified whether the convergence is reached, that is to say, whether $\forall j=1, \ldots, M\ Y_{i+1,j}=Y_{i,j}$. If convergence is reached (arrow Y in the Figure), the partitioning method is terminated at step (S10). If not (arrow N), the index i is incremented and the steps (S7), (S8) and (S9) are repeated with the new value of i.

(S10): The partitioning method produces an optimal partitioning PZ which is equal to $PY_{i+1}$.

Advantageously, in step (S2), for determining the two classes that maximize the similarity criterion, the representative elements of the classes are used, that is to say, that it is considered that two classes maximize the similarity criterion when their representative elements maximize this criterion. This means that the step (S2) comprises a calculation operation of the representative elements of each partition class $P_{j-1}$. In that case, the operation indicated at step (S6) is in fact executed in step (S2).

In a first embodiment the criterion of similarity is formed by the similarity function itself, that is to say, that the two classes which are combined are those of which the representative elements maximize the similarity function f.

In a second embodiment, which is more powerful, the criterion of similarity takes a weight factor into account. By way of example the two classes which are combined are those whose representative elements minimize a weighted dissimilarity function Dw of the type as described in the article cited above by K. Chidananda Gowda and E. Diday, that is to say:

$$D_w(Y_{i,j}, Y_{i,k}) = D(Y_{i,j}, Y_{i,k}) \cdot \sqrt{\frac{n_j \cdot n_k}{n_j + n_k}}$$

where $n_j$ and $n_k$ are weights assigned to the classes having index j and k, respectively, where D is the dissimilarity function and Dw is the weighted dissimilarity function.

Figure 2:
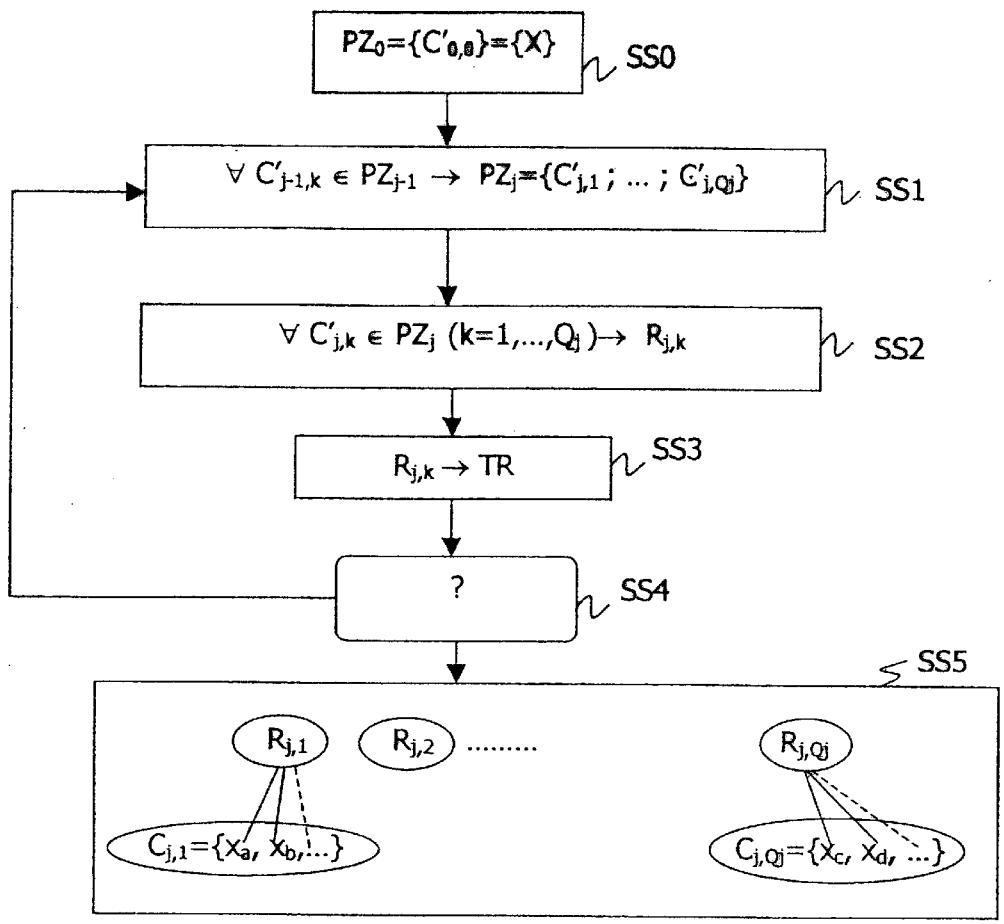
FIG. 2 is a block diagram of an example of a multilevel partitioning method according to the invention.

FIG. 2 shows a block diagram of an example of a multilevel partitioning method according to the invention. The multilevel partitioning method of FIG. 2 comprises the following steps:

(SS0): An initial partition $PZ_0$ is defined. This partition comprises a class $C_{0,0}$ which contains all the objects of the set X (SS1): A partition $PZ_j$ is created for each class $C_{j-1,k}$ (k is 1, ..., $Q_{j-1}$) of the partition $PZ_{j-1}$ which contains more than one object, by the use of the partitioning method described with reference to FIG. 1. This partition comprises $Q_j$ classes $C_{j,1}$ or $C_{j,2}$, ..., $C_{j,Qj}$.

(SS2): A representative element $R_{j,1}, R_{j,2}, ..., R_{j,Qj}$ is determined for each class $C_{j,1}, C_{j,2}, ..., C_{j,Qj}$ of the partition $Pz_j$.

(SS3): These representative elements are stored in a treelike structure TR, so that each representative element $R_{j,1, Rj,2}$, ..., $R_{j,Qj}$ is a son of the representative element of the class $C_{j-1,k}$.

(SS4): The steps (SS1), (SS2) and (SS3) are repeated until the partition $PZ_j$ verifies a predetermined criterion.

(SS5): When the predetermined criterion is verified, the objects of the classes $C_{j,1}, c_{j,2}, ..., C_{j,Qj}$ are stored so as to form the leaves of the nodes $R_{j,1}, R_{j,2}, ..., R_{j,Q}$, respectively.

In an advantageous manner the representative element of a class is the centroid of the class. For determining the centroid of a class first a fictitious element is calculated which has the same similarity with all the elements of the class. The centroid is formed by the element of the class that is closest to this fictitious element.

In a first example the multilevel partitioning method is terminated (that is to say, that the predetermined condition is considered verified) when the number of objects per class is closest possible to a maximum value.

In a second example the multilevel partitioning method is terminated when the objects contained in the partition classes $PZ_j$ are sufficiently close to the centroid of the class.

Figure 3:
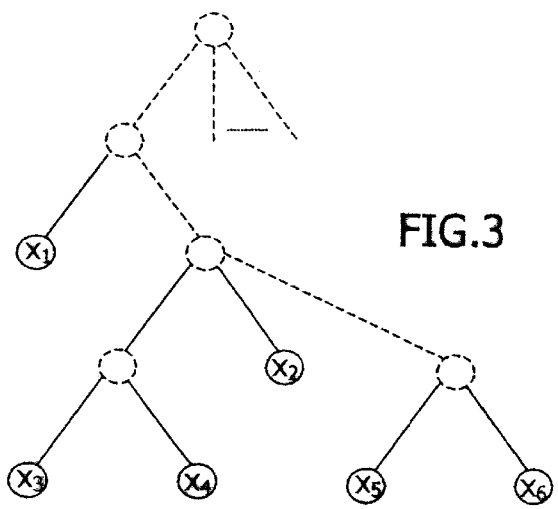
FIG. 3 is a diagram of an example of a tree-like structure obtained with a multilevel partitioning method according to the invention.

FIG. 3 shows an example of a tree obtained by applying such a multilevel partitioning method. The nodes of this tree are represented in dashed lines. They contain a representative element of one class. The leaves of this tree are represented in solid lines. They contain the objects $x_1, ..., x_N$ of the set X.

In an advantageous manner the objects of the set X are descriptions of audio-video data, for example, the descriptions of the type MPEG-7. These MPEG-7 descriptions relate to, for example, video shots, that is to say, sequences of video which do not contain any cut. A video shot is described, for example, in terms of camera movement, color movement, texture movement . . . Comparing two video shots boils down to comparing the descriptions of these two video shots which are instances of a same descriptor, for example, a color descriptor or a descriptor of a combination of color/texture. Such a comparison is made by using a similarity measure.

In a general manner the similarity measure f used is to satisfy the following properties:

f is an application which associates two objects with a real number, this real number is identical, whatever the order in which the two objects are considered, the real number associated with two identical objects is higher than the real number associated with two different objects.

In the case of the MPEG-7 descriptions, the similarity measures proposed in recommendation MPEG-7 are advantageously used for each type of descriptor.

The invention is not restricted to the MPEG-7 descriptions, nor to the descriptors and to the similarity measures defined in recommendation MPEG-7. Any type of descriptor can be used provided that a similarity measure is defined for this type of descriptor, and that this similarity measure verifies the 3 conditions defined above.

Figure 4:
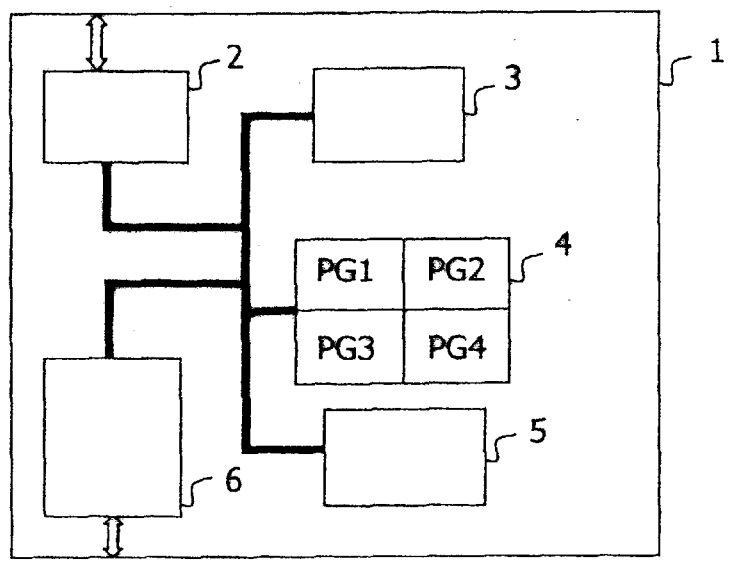
FIG. 4 is a diagram of an example of equipment according to the invention.

FIG. 4 represents an example of equipment according to the invention. This equipment is a camera 1 which comprises video capturing means 2 (for example of the type CCD). The camera 1 also comprises a memory 3 for storing data and a memory 4 for storing computer programs, a microprocessor assembly 5 for executing said programs, and a user interface 6 for receiving commands given by the user and for supplying data to the user. The memory 4 notably contains a set PG1 of one or various programs for coding the captured video. This set of programs PG1 notably delivers descriptions of MPEG-7 video shots, which are stored in a memory 3. The memory 4 also contains:

a program PG2 according to the invention, for making a partition of a set formed by several of said MPEG-7 descriptions, a program PG3, which provides a multilevel partition of the descriptions of this set, and a set PG4 containing one or various application programs which use the tree-like structure provided by the program PG3.

Figure 5:
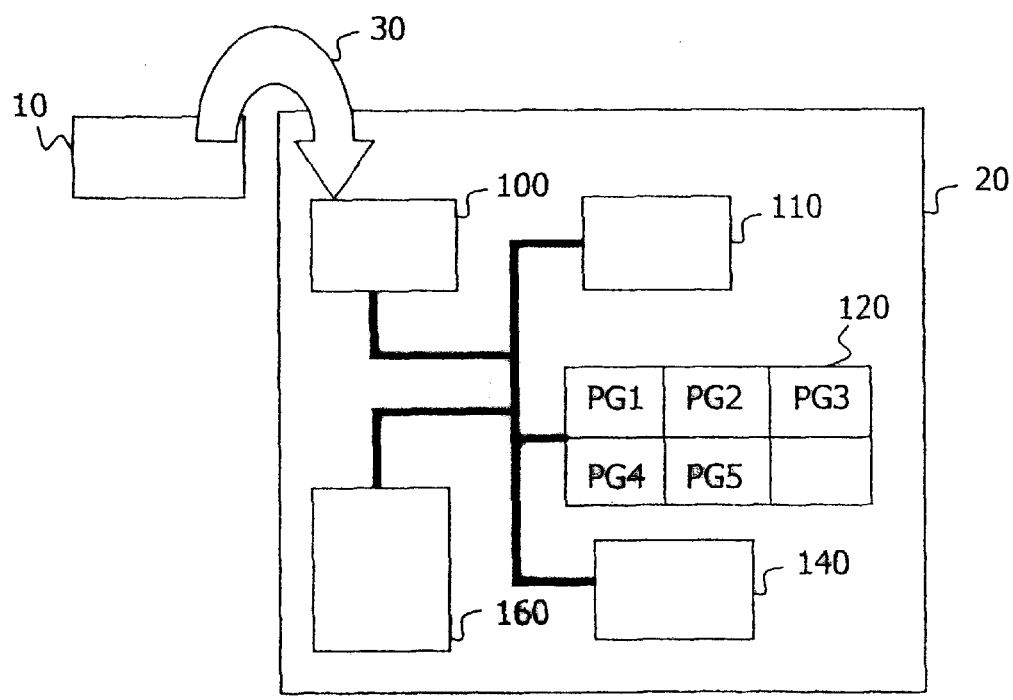
FIG. 5 is a diagram of an example of a transmission system according to the invention.

FIG. 5 shows a diagram of an example of a transmission system according to the invention. Such a system comprises a data source 10, user equipment 20 and a medium 30 for transporting signals between the data source 10 and the user equipment 20. The data source 10 is, for example, a video data source. The transmission medium, which transmits these video data to the user equipment, is formed, for example, by a cable network, a satellite transmission network, a radio link . . . The user equipment comprises a receiving circuit 100 which is notably used for receiving data transmitted by the source 10, a memory 110 for storing data, notably the received data, a memory 120 which contains computer programs, a microprocessor assembly 140 for executing said programs, and a user interface 160 for receiving commands given by the user and for supplying data to the user. The memory 120 notably contains a program PG5 for creating, based on the received video data, a database of object data which are MPEG-7 descriptions relating to video shots. It also contains a program PG2 according to the invention for making a partition of a set comprising objects of this database, a program PG3 which provides a multilevel partition of the objects of such a set and a set PG4 of one or various application programs which utilize the tree-like structure provided by the program PG3.

By way of example, the set PG4 comprises a first application program PG6 which is a navigation program. A navigation program permits the user to run through the database by giving to each level of the tree-like structure, a new instruction for moving up in the tree as a function of the obtained results.

By way of example, the set PG4 comprises a second application program PG6 which is a search by example program. A search by example program, permits a user to choose a descriptor and an example from a set of descriptors and from a set of examples which are proposed to him, and to fix the number of results he wishes to obtain, to serve as a basis for a search, by example. The search by example program, returns the number of results asked for by the user, which results are formed by descriptions that are closest to the chosen example from the point of view of the chosen descriptor.

Figure 6:
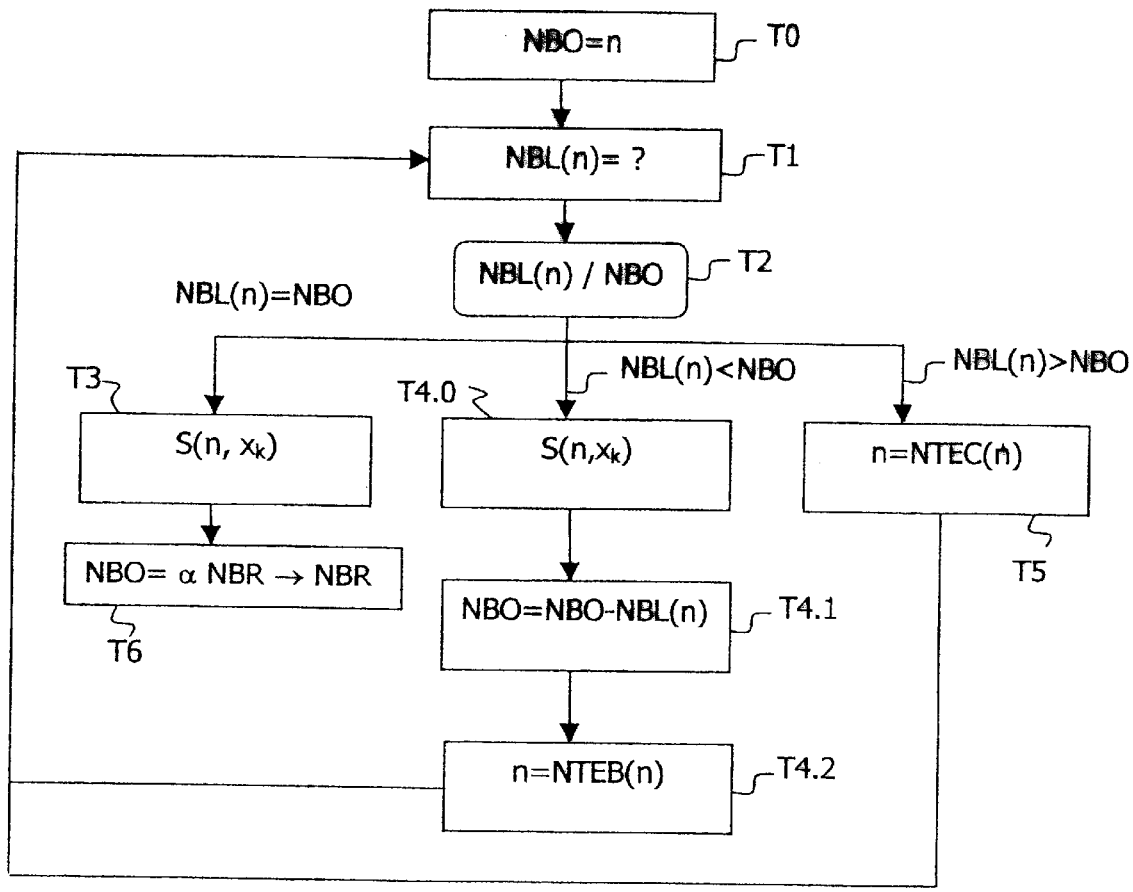
FIG. 6 is a flow chart describing the functioning of an example of a search method, for example, according to the invention.

FIG. 6 shows a flow chart describing the functioning of an example of a search method which may be implemented by a program PG6. The method of FIG. 6 starts from the root node of the tree. It comprises the following steps:

(T0): A variable NB0, which indicates the number of objects that remain to be selected, is initialized. Its initial value is equal to the predetermined number of objects to be selected NB0=N (T1): The number of leaves NBL(n), which depend on the current node n, is determined. The leaves which depend on a node are the leaves of this node as well as the leaves of nodes that depend on this node.

(T2): The number of leaves which depend on the current node NBL(n) is compared with the number of objects that remain to be selected NBO.

(T3): If they are equal (NBL(n)=NBO), the objects $x_k$ contained in the leaves which depend on the current node n are selected (in the Figure this selection operation is denoted $S(n,x_k)$). And the method is terminated.

(T4.0): If the number of leaves NBL(n) is lower than the number of objects that remain to be selected (NBL(n)<NB0), the objects $x_k$ contained in the leaves which depend on the current node n are selected ($S(n,x_k)$).

(T4.1): The variable NB0, which indicates the number of objects that remain to be selected, is updated by subtracting the number of leaves NBL(n) from the current number of objects that remain to be selected: NB0= NB0−NBL(n)

(T4.2): The brother of the current node that is closest to the example, denoted NTEB(n), becomes the new current node: n=NTEB(n), and the step (T1) is repeated.

(T5): If the number of leaves NBL(n) is higher than the number of objects that remain to be selected (NBL(n)>NBO), the son of the current node that is closest to the example, denoted NTEC(n), becomes the new current node: n=NTEC(n), and the step (T1) is repeated.

In an advantageous manner the number of objects to be selected NBO is fixed to be equal to a multiple of the number of results NBR desired by the user: NBO=α.NBR. In this case the search method according to the invention comprises an additional step (T6) for retaining of the α.NBR selected objects only the NBR objects that are closest to the example searched for. For example, this additional selection carried out in step (T6) comprises a systematic comparison of the α.NBR selected objects with the example searched for.

What is claimed is:

1. A partitioning method of partitioning a set of objects (X), comprising:
   (a) a first iterative partitioning step (S0 to S3) which utilizes a first partition ($P_0$) formed by classes that contain an object and which at each iteration (i) combines two classes that maximize a criterion of similarity for creating a new partition (Pi+1) used as an initial partition for the next step, until a partition ($P_{N-1}$) is obtained that contains only a single class,
   (b) a selection step (S4) of selecting from among the obtained partitions in step (a), a partition ($PY_0$) which comprises an optimal number of classes (M), characterized in that it comprises the sub-steps of:
      (i) a step (S6) of calculating elements ($Y_{0,j}$) which are representative of classes of the selected partition, and
      (ii) a second iterative partitioning step (S7, S8) which utilizes the selected partition as a first current partition ($PY_i$) and which, at each iteration (i), creates a new partition ($PY_{i+1}$) by associating each object of said set (X) with the element which represents the current partition ($Y_{i,j}$) it is closest to, and calculates elements ($Y_{i+1,j}$) which are representative of classes of the new partition ($PY_{i+1}$), the new partition forming the current partition for the next iteration, until the elements which are representative of the new partition are identical with the elements which are representative of the current partition ($Y_{i+1,j}=Y_{ij}$), and
   (c) one of displaying/printing said elements representative of the new partition.

2. A partitioning method of a set of objects as claimed in claim 1, characterized in that said objects are MPEG-7 descriptions and in that the proximity of two objects is determined relative to a particular descriptor.

3. A partitioning method as claimed in claim 1, characterized in that the proximity of two objects is determined by utilizing a similarity function f which satisfies the following properties: f is an application which associates two objects with a real number, this real number is identical whatever the order in which the two objects are considered, the real number associated with two identical objects is higher than the real number associated with two different objects.

4. A multilevel partitioning method of a set of objects according to claim 1, further comprising the steps of:
   (d) a step (SS2) of determining elements ($R_{j, 1}, \ldots R_{j, Qj}$) which are representative of classes of the obtained partition,
   (e) a step of storing said representative elements in a tree-like structure, said steps being executed a first time with a group of objects formed by said set, then repeated with groups of objects formed by the classes ($C_{j, 1}, \ldots, C_{j, Qj}$) of the obtained partitions ($PZ_j$) so as to obtain classes that satisfy a predetermined criterion, and
   (f) a step (SS5) of storing and outputting the last partition in said tree-like structure.

5. A search method of searching for a predetermined number of objects according to claim 4 in a tree-like structure of objects comprising nodes and leaves, said method further comprising the execution of the following steps in an iterative manner:

(g) a step (K2) of passing through the tree-like structure starting from a node and going to the leaves while passing by the nodes which contain the representative elements that are closest to the example, for selecting one or various leaves which correspond to one or various objects, (h) a step (K4) of testing whether the number of selected leaves is lower than said predetermined number of objects, and, (i) if the number of selected leaves is lower than said predetermined number of objects (K4), a new iteration of said steps starting from the brother node and going to the node passed through last, which is closest to said example.

6. A computer program comprising computer readable storage medium storing a computer program instructing a computer to perform the following steps:

(a) a first iterative partitioning step (S0 to S3) which utilizes a first partition ($P_0$) formed by classes that contain an object and which at each iteration (i) combines two classes that maximize a criterion of similarity for creating a new partition (Pi+1) used as an initial partition for the next step, until a partition ($P_{N-1}$) is obtained that contains only a single class, (b) a selection step (S4) of selecting from among the obtained partitions, a partition ($PY_0$) which comprises an optimal number of classes (M), characterized in that it comprises the following sub-steps:

(i) a step (S6) of calculating elements ($Y_{0,i}$) which are representative of classes of the selected partition, and (ii) a second iterative partitioning step (S7, S8) which utilizes the selected partition as a first current partition ($PY_i$) and which, at each iteration (i), creates a new partition ($PY_{i+1}$) by associating each object of said set (X) with the element which represents the current partition ($Y_{i,j}$) it is closest to, and calculates elements ($Y_{i+1,j}$) which are representative of classes of the new partition ($PY_{i+1}$), the new partition forming the current partition for the next iteration, until the elements which are representative of the new partition are identical with the elements which are representative of the current partition ($Y_{i+1,i=Yi,j}$), and (c) one of displaying/printing said elements representative of the new partition.

7. A computer program according to claim 6 further comprising program code instructions for implementing the following additional steps:

(d) a step (SS2) of determining elements ($R_{j,1}, \ldots R_{j,Qj}$) which are representative of classes of the obtained partition, (e) a step of storing said representative elements in a tree-like structure, said steps being executed a first time with a group of objects formed by said set, then repeated with groups of objects formed by the classes ($C_{j,1}, \ldots, C_{j,Qj}$) of the obtained partitions ($PZ_j$) so as to obtain classes that satisfy a predetermined criterion, and (f) a step (SS5) of storing the last partition in said tree-like structure.

8. A computer program according to claim 7 further comprising program code instructions the following additional steps:

(g) a step (K2) of passing through the tree-like structure starting from a node and going to the leaves while passing by the nodes which contain the representative elements that are closest to the example, for selecting one or various leaves which correspond to one or various objects, (h) a step (K4) of testing whether the number of selected leaves is lower than said predetermined number of objects, and, (i) if the number of selected leaves is lower than said predetermined number of objects (K4), a new iteration of said steps starting from the brother node and going to the node passed through last, which is closest to said example.

9. A transmission system for transporting signals between a data source and a user equipment, comprising:

a data source;

a communications medium that is adapted to communicate with the data source;

user equipment that communicates with the data source via the communications medium, said user equipment comprises a receiving circuit, a microprocessor, a memory, and a plurality of program modules stored in a portion of the memory, display means and entry means;

wherein a first program module PG1 comprises one or more programs for coding captured video;

wherein a second program module PG2 creates a partition of meta-data comprising a description of a set of captured video received from the first program module and with the captured video data;

wherein a third program module PG3 creates a multilevel partition of the description in the second program module, said multilevel partition comprising a tree-like structure;

wherein a fourth program module PG4 comprises an application program that utilizes the tree-like structure provided by PG3;

wherein a fifth program module PG5 comprises means for creating a database of the data output by the fourth program module; and wherein a sixth program module comprises a second application program that permits a user to choose a descriptor and an example from a set of descriptors and parse through an output of the fifth program module to receive as an output a number of returns that are closest to a chosen descriptor.

* * * * *